(12) United States Patent
Ke (10) Patent No.: US 11,216,381 B2
(45) Date of Patent: Jan. 4, 2022

(54) DATA STORAGE DEVICES AND DATA PROCESSING METHODS

(71) Applicant: Silicon Motion, Inc., Jhubei (TW)

(72) Inventor: Kuan-Yu Ke, Zhubei (TW)

(73) Assignee: Silicon Motion, Inc., Hsinchu County (TW)

( * ) Notice: Subject to any disclaimer, the term of this patent is extended or adjusted under 35 U.S.C. 154(b) by 69 days.

(21) Appl. No.: 16/704,629

(22) Filed: Dec. 5, 2019

(65) Prior Publication Data

US 2020/0192810 A1   Jun. 18, 2020

(30) Foreign Application Priority Data

Dec. 18, 2018   (TW) .................................. 107145763

(51) Int. Cl.
| | |
|---|---|
| *G06F 12/00* | (2006.01) |
| *G06F 13/00* | (2006.01) |
| *G06F 12/0882* | (2016.01) |
| *G06F 12/02* | (2006.01) |
| *G06F 12/0873* | (2016.01) |
| *G06F 3/06* | (2006.01) |

(52) U.S. Cl.
CPC ........ *G06F 12/0882* (2013.01); *G06F 3/0608* (2013.01); *G06F 3/0653* (2013.01); *G06F 3/0679* (2013.01); *G06F 12/0246* (2013.01); *G06F 12/0253* (2013.01); *G06F 12/0873* (2013.01); *G06F 2212/683* (2013.01); *G06F 2212/7201* (2013.01); *G06F 2212/7209* (2013.01)

(58) Field of Classification Search
CPC .... G06F 3/0608; G06F 3/0653; G06F 3/0679; G06F 12/0882; G06F 12/0246; G06F 12/0253; G06F 12/0873; G06F 2212/683; G06F 2212/7201; G06F 2212/7209
USPC ........................................................ 711/118
See application file for complete search history.

(56) References Cited

U.S. PATENT DOCUMENTS

| | | | |
|---|---|---|---|
| 8,364,931 B2 * | 1/2013 | Chiang ............... | G06F 12/0246 711/206 |
| 2010/0131736 A1 * | 5/2010 | Lee ..................... | G06F 12/0292 711/202 |
| 2010/0332732 A1 * | 12/2010 | Chiang ............... | G06F 12/0246 711/103 |
| 2020/0371910 A1 * | 11/2020 | Ke ..................... | G06F 12/0873 |

* cited by examiner

*Primary Examiner* — Sheng Jen Tsai
(74) *Attorney, Agent, or Firm* — Winston Hsu (57) ABSTRACT

A data storage device includes a memory device and a memory controller. The memory controller selects a predetermined memory device to receive data and accordingly records multiple logical addresses in a first mapping table. The first mapping table records which logical page the data stored in each physical page of the predetermined memory block is directed to. When the predetermined memory block is full, the memory controller edits a second mapping table and a third mapping table according to the first mapping table. The second mapping table corresponds to multiple logical pages and records which memory block and which physical page is the data of each logical page stored in. The third mapping table corresponds to the physical pages of the predetermined memory block and indicates whether each physical page is a valid page or an invalid page.

6 Claims, 8 Drawing Sheets

FIG. 1

| Table_1 | Table_2 | Table_3 |
|---|---|---|
| 10 | 100, 5 | |
| 5 | | |
| 3 | 5, 1022 | |
| 201 | | |
| 100 | 41, 123 | |
| 8 | | |
| 1031 | | |
| 123 | 100, 5 | |
| 5 | | |
| 31 | 15, 122 | |
| 1201 | | |
| 2100 | | |
| 228 | 101, 2008 | |
| 1566 | | |

⋮   ⋮   ⋮

| |
|---|
| 101, 0 |
| |
| |
| |

FIG. 2A

| Table_1 | Table_2 | Table_3 |
|---|---|---|
| 10 | 100, 5 | |
| 5 | | |
| 3 | 5, 1022 | |
| 201 | | |
| 100 | 41, 123 | |
| 8 | | |
| 1031 | | |
| 123 | 100, 5 | |
| 5 | | |
| 31 | 15, 122 | |
| 1201 | 101, 0 | |
| 2100 | | |
| 228 | 101, 2008 | |
| 1566 | | |
| ⋮ | ⋮ | ⋮ |

| | 101, 0 | |
|---|---|---|
| | | |
| | | |
| | | |

FIG. 2B

| Table_1 | Table_2 | Table_3 |
|---|---|---|
| 10 | 100, 5 | |
| 5 | | |
| 3 | 5, 1022 | |
| 201 | | |
| 100 | 41, 123 | |
| 8 | | |
| 1031 | 101, 200 | |
| 123 | 100, 5 | |
| 5 | | |
| 31 | 15, 122 | |
| 1201 | 101, 0 | |
| 2100 | | |
| 228 | 101, 2008 | |
| 1566 | | |
| ⋮ | ⋮ | ⋮ |
| | 101, 0 | |

FIG. 2C

| Table_1 | Table_2 | Table_3 |
|---|---|---|
| 10 | 100, 5 | |
| 5 | | |
| 3 | 5, 1022 | |
| 201 | | |
| 100 | 41, 123 | |
| 8 | 101, 1 | |
| 1031 | 101, 200 | |
| 123 | 100, 5 | |
| 5 | | |
| 31 | 15, 122 | |
| 1201 | 101, 0 | |
| 2100 | | |
| 228 | 101, 2008 | |
| 1566 | | |
| ⋮ | ⋮ | ⋮ |
| | 101, 0 | |

FIG. 2D

| Table_1 | Table_2 | Table_3 |
|---|---|---|
| 10 | 100, 5 | |
| 5 | | |
| 3 | 5, 1022 | |
| 201 | | |
| 100 | 41, 123 | |
| 8 | 101, 1 | |
| 1031 | 101, 200 | |
| 123 | 100, 5 | |
| 5 | | |
| 31 | 15, 122 | |
| 1201 | 101, 0 | |
| 2100 | | |
| 228 | 101, 2008 | |
| 1566 | | |

| | 101, 0 |
|---|---|
| | |
| | |

FIG. 2E

| Table_1 | Table_2 | Table_3 |
|---|---|---|
| 10 | 100, 5 | |
| 5 | | |
| 3 | 5, 1022 | |
| 201 | | |
| 100 | 41, 123 | |
| 8 | 101, 8 | |
| 1031 | 101, 200 | |
| 123 | 100, 5 | |
| 5 | | |
| 31 | 15, 122 | |
| 1201 | 101, 0 | |
| 2100 | | |
| 228 | 101, 2008 | |
| 1566 | | |
| ⋮ | ⋮ | ⋮ |

| |
|---|
| 101, 0 |
| |
| |
| |

DATA STORAGE DEVICES AND DATA PROCESSING METHODS

CROSS REFERENCE TO RELATED APPLICATIONS

This Application claims priority of Taiwan Patent Application No. 107145763, filed on Dec. 18, 2018, the entirety of which is incorporated by reference herein.

BACKGROUND OF THE INVENTION

Field of the Invention

The invention relates to a data storage device and a data processing method, which is capable of rapidly and accurately searching for valid pages of a memory block.

Description of the Related Art

With the rapid growth of data storage technology in recent years, many data storage devices—such as memory cards manufactured in compliance with the SD/MMC standards, CF standards, MS standards or XD standards, as well as solid state hard drives, Embedded Multi Media Cards (eMMC) and Universal Flash Storage (UFS)—have been used widely for a variety of purposes. Therefore, effective control of access to these data storage devices is an important issue.

In order to improve the access performance of the data storage device, a novel data processing method which is capable of effectively processing the data storage in the memory device and the access performance of the memory device is proposed.

BRIEF SUMMARY OF THE INVENTION

Data storage devices and data processing methods are provided. An exemplary embodiment of a data storage device comprises a memory device and a memory controller. The memory controller comprises a plurality of memory blocks, and each memory block comprises a plurality of pages. The memory controller is coupled to the memory device and configured to access the memory device. The memory controller is configured to select a predetermined memory device to receive data and accordingly store a plurality of logical addresses in a first mapping table. The memory controller comprises a buffer memory, the first mapping table is stored in the buffer memory to record which logical page the data stored in each physical page of the predetermined memory block is directed to. When the predetermined memory block is full, the memory controller is configured to edit a second mapping table and a third mapping table according to the first mapping table and store the second mapping table and the third mapping table in the memory device. The second mapping table corresponds to a plurality of logical pages and records which memory block and which physical page is data of each logical page stored in. The third mapping table corresponds to the physical pages of the predetermined memory block and indicates whether each physical page is a valid page or an invalid page.

An exemplary embodiment of a data processing method for a data storage device comprising a memory device and a memory controller, wherein the memory device comprises a plurality of memory blocks, each memory block comprises a plurality of pages, and the memory controller is coupled to the memory device and configured to access the memory device. The method is performed by the memory controller and comprises: selecting a predetermined memory device to receive data and accordingly storing a plurality of logical addresses in a first mapping table, wherein the first mapping table is stored in a buffer memory of the memory controller and is configured to record which logical page the data stored in each physical page of the predetermined memory block is directed to; when the predetermined memory block is full, editing a second mapping table and a third mapping table according to the first mapping table, wherein the second mapping table corresponds to a plurality of logical pages and is configured to record which memory block and which physical page is data of each logical page stored in, and the third mapping table corresponds to the physical pages of the predetermined memory block and is configured to indicate whether each physical page is a valid page or an invalid page; and storing the second mapping table and the third mapping table in the memory device.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

In order to make the objects, features and advantages of the invention more comprehensible, specific embodiments of the invention are set forth in the accompanying drawings. This description is made for the purpose of illustrating the general principles of the invention and should not be taken in a limiting sense. It should be understood that the following embodiments can be implemented by software, hardware, firmware, or any combination thereof. The scope of the invention is determined by reference to the appended claims.

Figure 1:
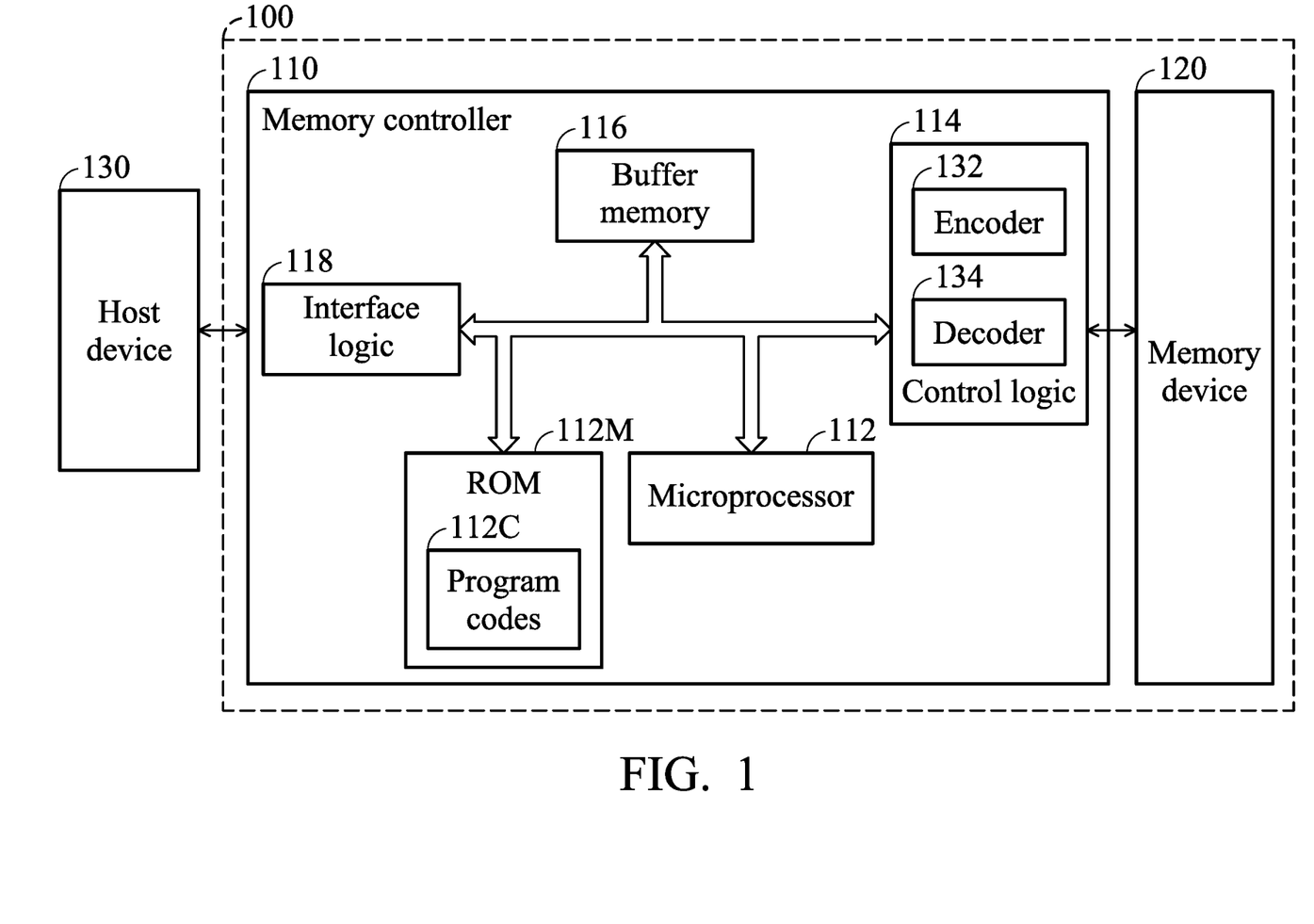
FIG. 1 shows an exemplary block diagram of a data storage device according to an embodiment of the invention.

FIG. 1 shows an exemplary block diagram of a data storage device according to an embodiment of the invention. The data storage device 100 may comprise a memory device 120, such as a flash memory module, and a memory controller 110. The memory controller 110 is configured to access the memory device 120. According to an embodiment of the invention, the memory controller 110 may comprise a microprocessor 112, a Read Only Memory (ROM) 112M, a control logic 114, a buffer memory 116 and an interface logic 118. The ROM 112M is configured to store program codes 112C. The microprocessor 112 is configured to execute the program codes 112C, thereby controlling access to the memory device 120. The control logic 114 may comprise an encoder 132 and a decoder 134. The encoder 132 is configured to encode the data to be written into the memory device 120 so as to generate corresponding correcting/checking code (also called error correction code (ECC)). The decoder 134 is configured decode the data read out from the memory device 120.

Typically, the memory device 120 may comprise a plurality of flash memory chips, and each flash memory chip may comprise a plurality of memory blocks. The access unit of an erase operation performed by the controller (e.g., the memory controller 110, through the execution of the program codes 112C by the microprocessor 112) on the memory device 120 may be one memory block. In addition, a memory block may record (comprise) a predetermined number of pages, that is, the physical pages, and the access unit of a write operation performed by the controller (e.g., the memory controller 110, through the execution of the program codes 112C by the microprocessor 112) on the memory device 120 may be one page.

In practice, the memory controller 110 may perform various control operations by using its own internal components through the execution of the program codes 112C by the microprocessor 112. For example, the memory controller 110 may use the control logic 114 to control the access operations (especially the access operation for at least a memory block or at least a page) of the memory device 120, use the buffer memory 116 to perform necessary data buffer operations, and use the interface logic 118 to communicate with a host device 130. The buffer memory 116 may be implemented by a Random Access Memory (RAM). For example, the buffer memory 116 may be an SRAM, but the invention should not be limited thereto.

In an embodiment of the invention, the data storage device 100 may be a portable storage device (for example, the memory card in compliance with the SD/MMC, CF, MS and/or XD standard), and the host device 130 may be an electronic device, such as a mobile phone, a notebook computer, a desktop computer . . . etc., capable of connecting to the data storage device. In another embodiment of the invention, the data storage device 100 may be a solid state hard disk or an embedded storage device in compliance with the Universal Flash Storage (UFS) or the Embedded Multi Media Card (EMMC) standards, and may be equipped in an electronic device such as a mobile phone, a notebook computer, or a desktop computer. In such an embodiment, the host device 130 may be a processor of the electronic device.

The host device 130 may issue commands, such as the read command or the write command, to the data storage device 100, so as to access the data stored in the memory device 120, or the host device 130 may issue commands to further control or manage the data storage device 100.

According to an embodiment of the invention, the memory blocks comprised in the memory device 120 may be configured as the Single-Level Cell (SLC) memory blocks, the Multiple-Level Cell (MLC) memory blocks and/or the Triple-Level Cell (TLC) memory blocks. The memory cell of the SLC memory block is configured to store one bit data, the memory cell of the MLC memory block is configured to store two bits data, and the memory cell of the TLC memory block is configured to store three bits data.

Generally, the memory device 120 may be divided into three regions, comprising a system region, a data region and a spare region. The memory controller 110 is configured to select a predetermined memory block from the spare region as a cache memory, or called a buffer, to receive data and buffer the data. When the predetermined memory block (that is, the buffer) is full (that is, has been fully written with data), the memory controller may further update the predetermined memory block currently being utilized as a buffer as a data block in the data region. For example, when the predetermined memory block currently being utilized as a buffer to receive data is an MLC or a TLC memory block, when the buffer is full, the predetermined memory block may be directly updated as a data block in the data region. When the predetermined memory block currently being utilized as a buffer to receive data is an SLC memory block, when a predetermined number of buffers are full, the memory controller may perform a garbage collection procedure to move the data stored in the buffers to an MLC or a TLC memory block (the target memory block) and update the target memory block as a data block in the data region.

According to an embodiment of the invention, the memory controller 110 is configured to maintain a first mapping table in the buffer memory 116. When using the predetermined memory block to receive data, the memory controller 110 is configured to accordingly store a plurality of logical addresses in the first mapping table. According to an embodiment of the invention, the first mapping table is a Flash to Host (F2H) mapping table. The first mapping table is configured to record which logical page the data stored in each physical page of the predetermined memory block is directed to. For example, the first mapping table may record the Logical Block Address (LBA) of a corresponding logical page, or may record the logical address of a logical page in other format.

According to an embodiment of the invention, the first mapping table records the logical addresses in the form of an array. An array index of the first mapping table corresponds to a physical page of the predetermined memory block. That is, the value of the array index of the first mapping table has a one-to-one mapping relationship with the index or the page number of the physical page of the predetermine memory block. For example, suppose that a starting array index of the first mapping table is 0, the logical address recorded in the first record in the first mapping table Table_1, that is, Table_1[0], is the address of the logical page that the data stored in the first physical page of the predetermined memory block directs to. Similarly, the logical address recorded in the second record in the first mapping table Table_1, that is, Table_1[1], is the address of the logical page that the data stored in the second physical page of the predetermined memory block directs to, and so on.

According to an embodiment of the invention, the memory controller 110 may sequentially write the data into the physical pages of the predetermined memory block according to the physical page number in an ascending manner. Therefore, the memory controller 110 may also record the logical address of the logical page corresponding to each physical page in the first mapping table Table_1 according to the array index in an ascending manner.

According to an embodiment of the invention, when the predetermined memory block is full, the memory controller 110 is configured to edit the second mapping table Table_2 and the third mapping table Table_3 according to the first mapping table Table_1. According to an embodiment of the invention, the second mapping table Table_2 and the third mapping table Table_3 may be stored in the system region of the memory device 120. The second mapping table Table_2 may be a Host to Flash (H2F) mapping table. The data recorded in the second mapping table corresponds to a plurality of logical pages. The second mapping table may record a memory block number and a page number that correspond to each logical page in the form of an array, so as to record which memory block and which physical page data of each logical page is directed to (that is, which memory block and which physical page is the data of each logical page stored in). An array index of the second mapping table Table_2 corresponds to one of the logical pages. That is, the value of the array index of the second mapping table has a one-to-one mapping relationship with the index or the number of the logical page. For example, suppose that a starting array index of the second mapping table Table_2 is 0, the memory block number and the page number recorded in the first record in the second mapping table Table_2, that is, Table_2[0], is the physical memory block number and the physical page number that the first logical page in the host device system stored in, the memory block number and the page number recorded in the second record in the second mapping table Table_2, that is, Table_2[1], is the physical memory block number and the physical page number that the second logical page in the host device system stored in, and so on.

According to an embodiment of the invention, when the predetermined memory block is full, the memory controller 110 is configured to edit the third mapping table according to the first mapping table and the second mapping table. The data recorded in the third mapping table Table_3 corresponds to a plurality of physical pages of the predetermined memory block. The third mapping table Table_3 records whether each physical page of the predetermined memory block is a valid page or an invalid page in the form of an array. An array index of the third mapping table corresponds to one physical page of the predetermined memory block. That is, the value of the array index of the third mapping table has a one-to-one mapping relationship with the index or the page number of the physical page of the predetermine memory block.

For example, suppose that a starting array index of the third mapping table Table_3 is 0, the content of the first record in the third mapping table Table_3, that is, Table_3 [0], indicates whether the first physical page of the predetermined memory block is a valid page or an invalid page, the content of the second record in the third mapping table Table_3, that is, Table_3[1], indicates whether the second physical page of the predetermined memory block is a valid page or an invalid page, and so on.

According to an embodiment of the invention, when editing the second mapping table Table_2, the memory controller 110 is configured to start from a starting array index of the first mapping table Table_1 to sequentially check the logical addresses recorded in the first mapping table Table_1, and check the second mapping table Table_2 to find content recorded in corresponding positions of the second mapping table Table_2 according to the logical addresses recorded in the first mapping table. The memory controller 110 is further configured to update the content recorded in the second mapping table Table_2 according to the memory block number of the predetermined memory block and a corresponding array index of the first mapping table Table_1.

Figure 2A:
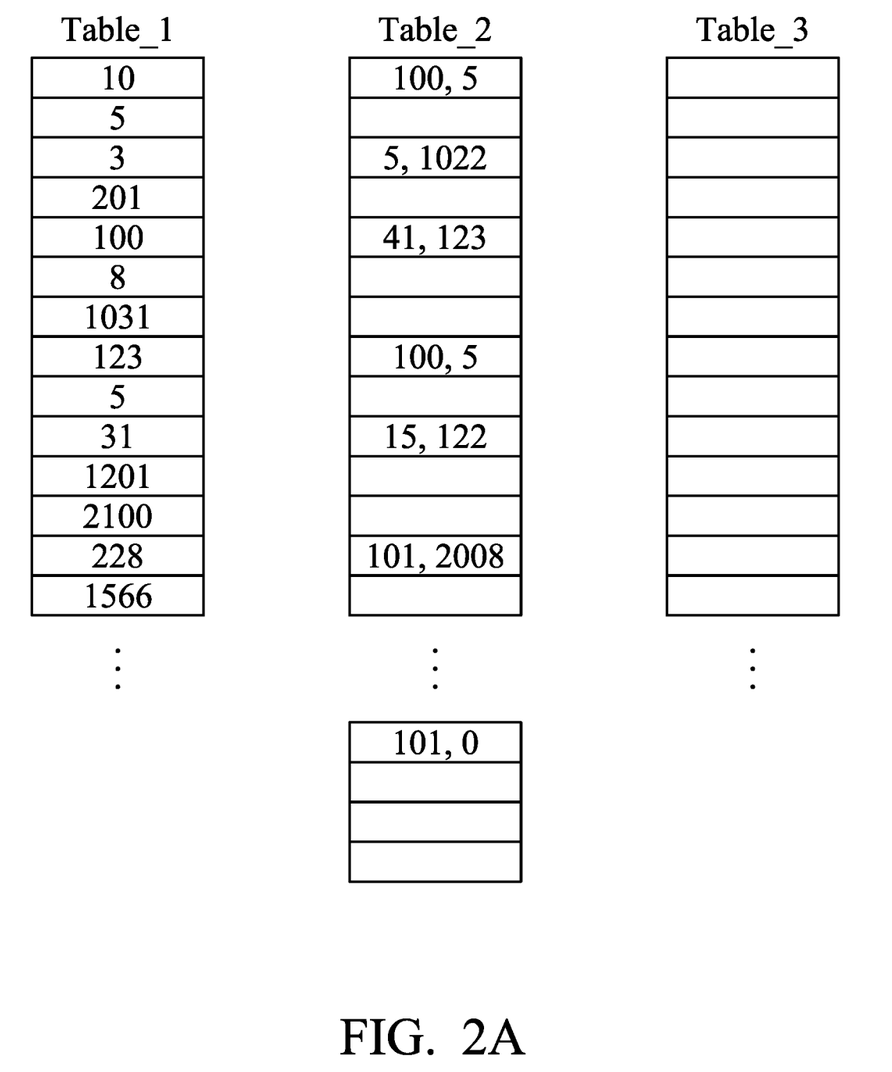
FIG. 2A shows the exemplary mapping tables according to an embodiment of the invention.
Figure 2B:
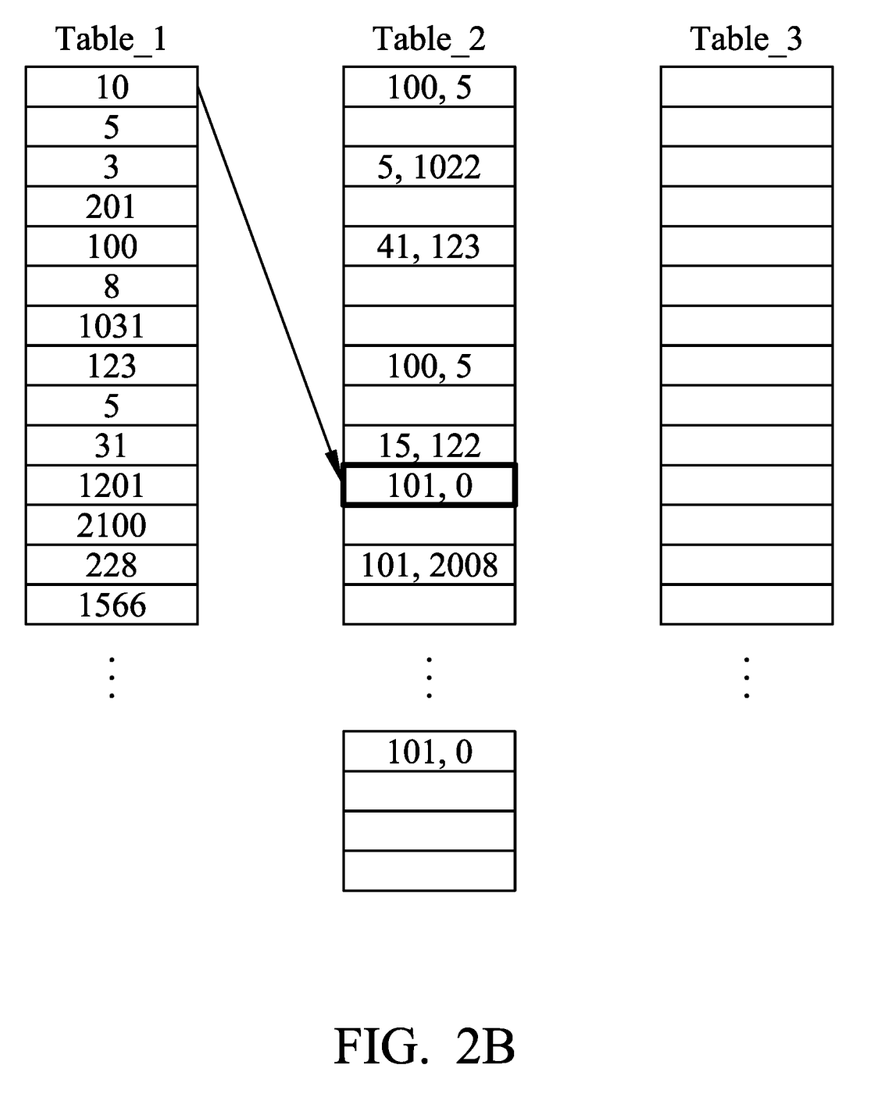
FIG. 2B shows the exemplary mapping tables according to an embodiment of the invention.

FIG. 2A and FIG. 2B show the exemplary mapping tables according to an embodiment of the invention to illustrate the operation of editing the second mapping table Table_2 according to the first mapping table Table_1. In this embodiment, as shown in FIG. 2A, the content of the first record Table_1[0] in the first mapping table Table_1 is 10, which means that the address of the logical page that the data stored in the first physical page of the predetermined memory block directs to is 10. The memory controller 110 then looks up the second mapping table Table_2 according to the logical address 10 and loads one or a plurality of records including the record of logical address 10 into the buffer memory 116, so as to edit or update the content of the second mapping table Table_2. For example, the memory controller 110 may access the $1^{st}$ to $100^{th}$ records recorded in the second mapping table Table_2 and load the content of the $1^{st}$ to $100^{th}$ records into the buffer memory 116. Then, the memory controller 110 may write the memory block number of the predetermined memory block and page number of the physical page corresponding to a record of the first mapping table Table_1 that is currently being processed (or, an array index of a record of the first mapping table Table_1 that is currently being processed) in the corresponding position of the second mapping table Table_2. For example, suppose that the memory block number of the predetermined memory block is 100 and the page number of the predetermined memory block is configured from the number 0, the memory controller 110 may write the content (101,0) into the $11^{th}$ record of the second mapping table Table_2 as shown in FIG. 2B, where the number 0 is the page number of the first physical page (also corresponds to the array index of the first record of the first mapping table Table_1).

Figure 2C:
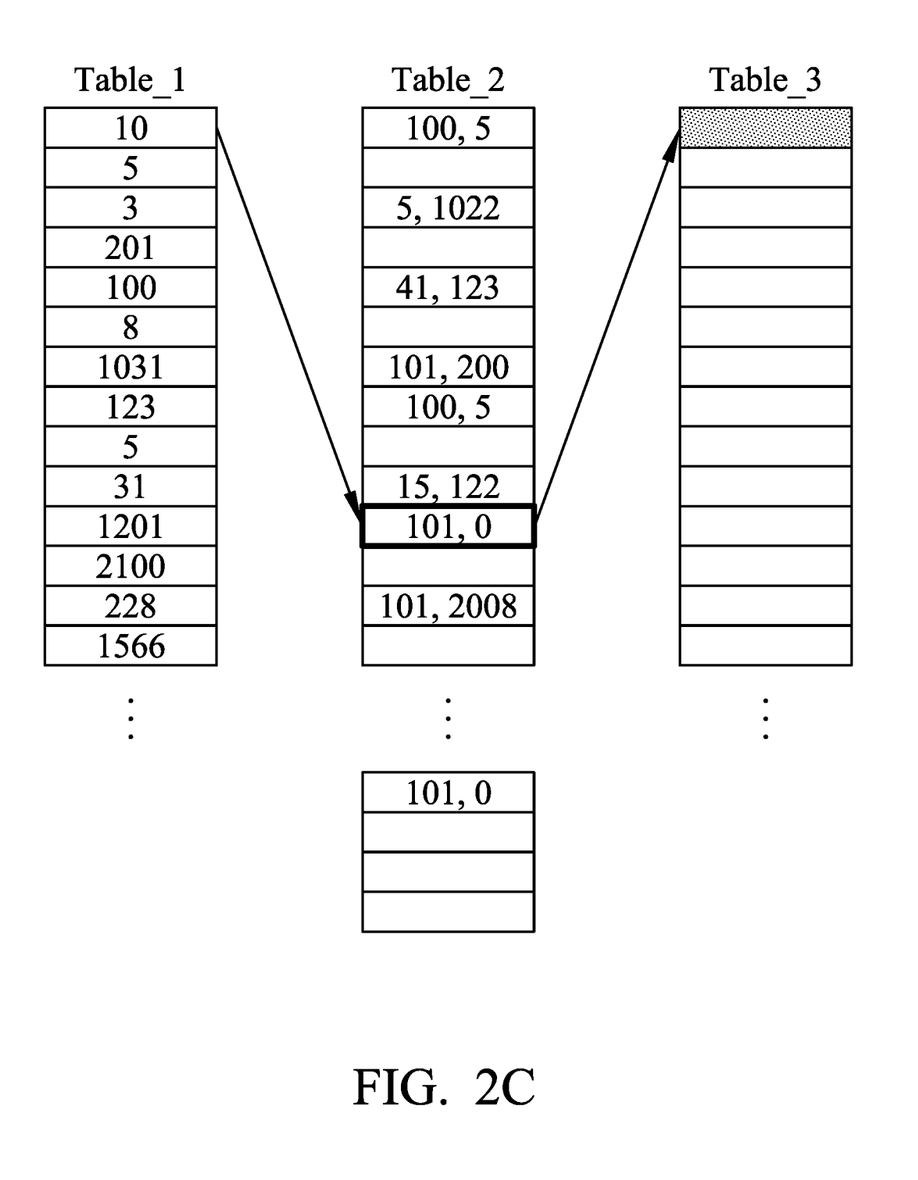
FIG. 2C shows the exemplary mapping tables according to an embodiment of the invention.

FIG. 2C and FIG. 2C show the exemplary mapping tables according to an embodiment of the invention to illustrate the operation of editing the third mapping table Table_3 according to the first mapping table Table_1. According to an embodiment of the invention, when editing the third mapping table Table_3, the memory controller 110 is configured to set the content of the third mapping table Table_3 that is in same position (has same array index) as the record in the first mapping table Table_1 to 'valid'. For example, after updating the content recorded in the second mapping table Table_2 according to the memory block number (for example, the aforementioned 101) of the predetermined memory block and a corresponding array index (for example, the aforementioned 0) of the first mapping table Table_1, the memory controller is configured to set content of the corresponding array index (for example, the aforementioned 0) in the third mapping table Table_3 as 'valid'. As shown in FIG. 2C, the first record Table_3[0] of the third mapping table Table_3 is filled with gray meshes to represent that the corresponding content is set to 'valid'.

Figure 2D:
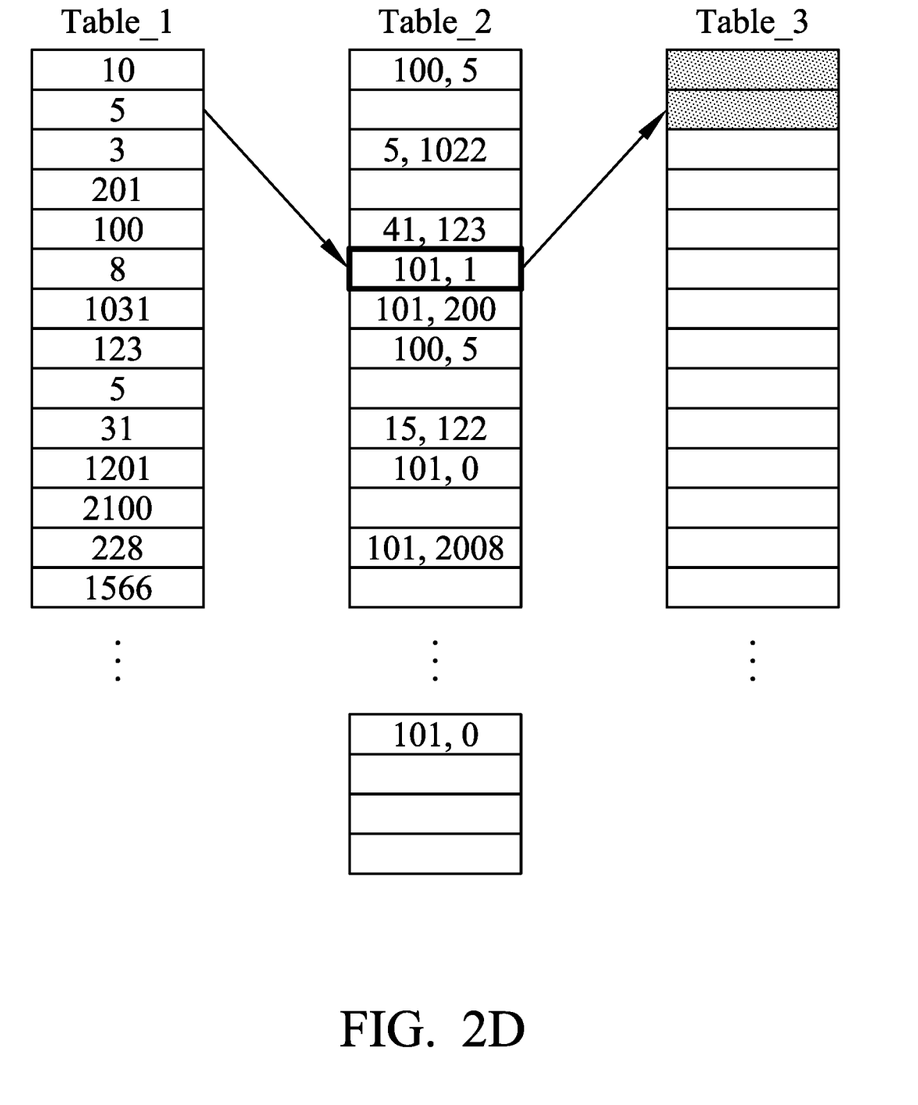
FIG. 2D shows the exemplary mapping tables according to an embodiment of the invention.

After updating/editing the second mapping table Table_2 and the third mapping table Table_3 according to the first record of the first mapping table Table_1, the memory controller 110 then updates/edits the second mapping table Table_2 and the third mapping table Table_3 according to the second record of the first mapping table Table_1, and so on. For example, as shown in FIG. 2D, since the content of the second record Table_1[1] of the first mapping table Table_1 is 5, the memory controller 110 is configured to write the content (101,1) into the $6^{th}$ record of the second mapping table Table_2 and set the content of the corresponding array index (for example, the aforementioned 1) in the third mapping table Table_3 as 'valid'.

However, sometimes, the data stored in the memory block may become invalid. For example, when the data stored in a specific page directs to the same logical address as another page, and the data stored in the specific page is earlier than the other, the specific page should be determined as an invalid page. Therefore, according to an embodiment of the invention, when editing the third mapping table, the memory controller 110 may not only refer to the content recorded in the first mapping table Table_1, but also refer to the content recorded in the second mapping table Table_2. In this manner, when an invalid page is found, the memory controller 110 may amend the content of the corresponding record that was set to 'valid' in the third mapping table Table_3 to become 'invalid', so as to accurately record the information regarding the valid pages and the invalid pages of the predetermined memory block.

According to an embodiment of the invention, when the memory controller 110 finds that the memory block number of the predetermined memory block and a first array index have been recorded in a specific position of the second mapping table Table_2 when looking up the second mapping table Table_2, and also finds that the same logical address recorded in a second array index of the first mapping table directs to the specific position of the second mapping table, too (that is, the same content (logical address) has been recorded in the first mapping table in more than one records corresponding to at least the first array index and the second array index), the memory controller 110 is not only configured to update content recorded in the specific position of the second mapping table Table_2 according to the memory block number of the predetermined memory block and the second array index, but also configured to set content of the second array index in the third mapping table Table_3 as valid and set content of the first array index in the third mapping table Table_3 as invalid.

Figure 2E:
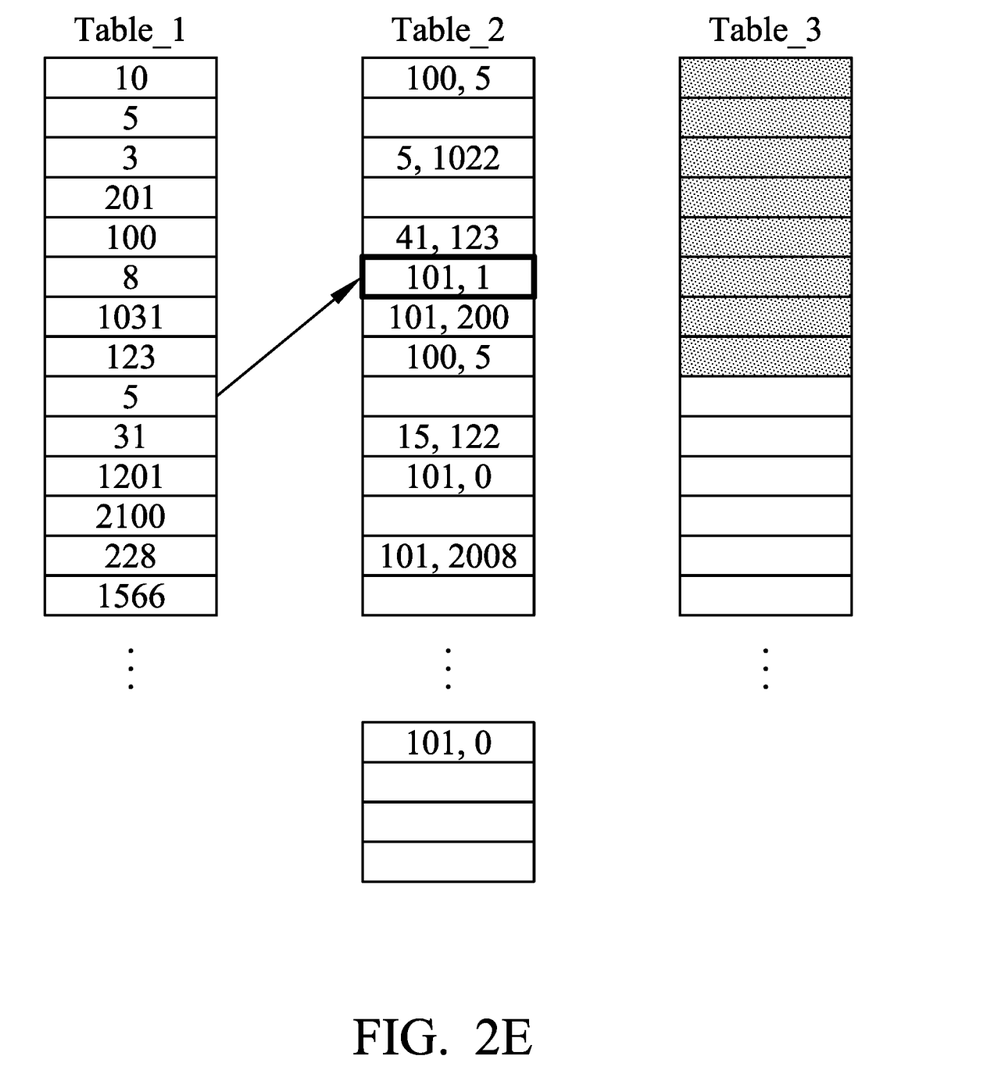
FIG. 2E shows the exemplary mapping tables according to an embodiment of the invention.
Figure 2F:
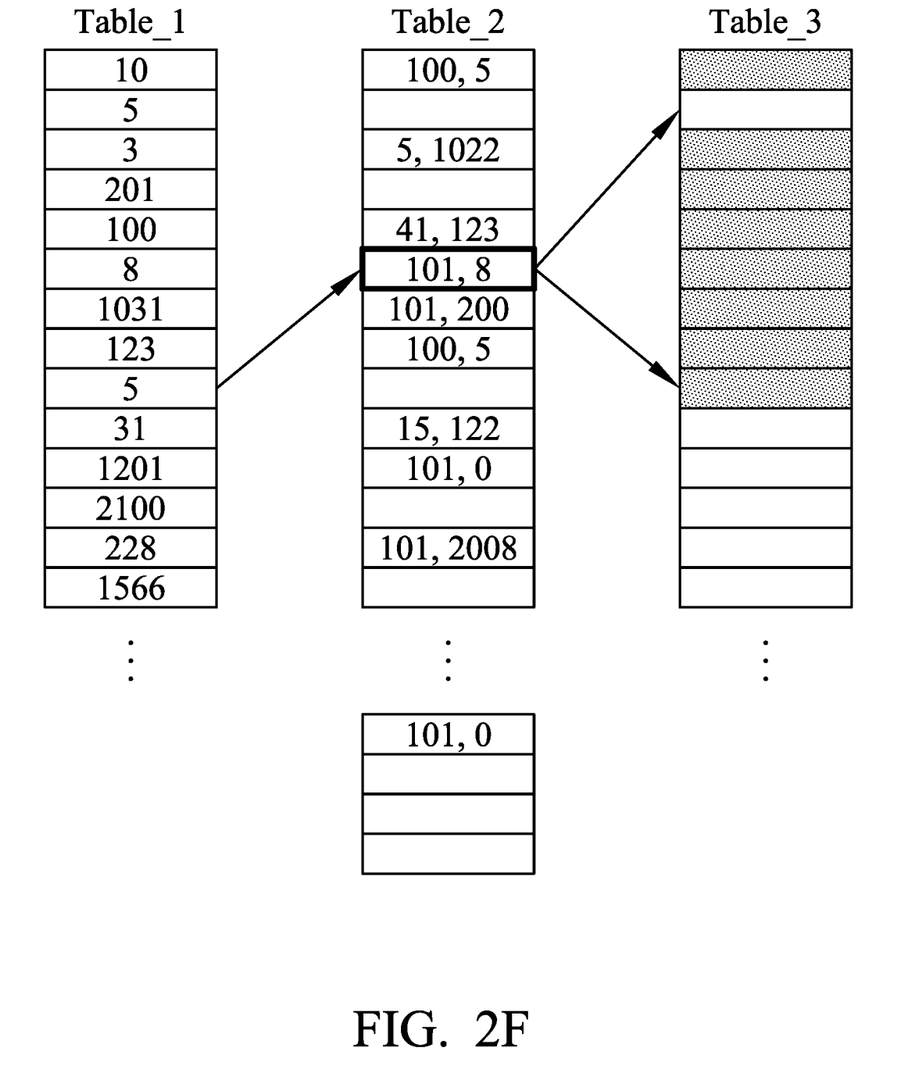
FIG. 2F shows the exemplary mapping tables according to an embodiment of the invention.

FIG. 2E and FIG. 2F show the exemplary mapping tables according to an embodiment of the invention to illustrate the operation of editing the third mapping table Table_3 according to the first mapping table Table_1 and the second mapping table Table_2. As shown in FIG. 2E, when the memory controller 110 is updating/editing the second mapping table Table_2 and the third mapping table Table_3 according to the $9^{th}$ record of the first mapping table Table_1, since the content of the $9^{th}$ record Table_1[8] of the first mapping table Table_1 is 5, the memory controller 110 has to write the content (101,8) into the $6^{th}$ record of the second mapping table Table_2 and set content of the corresponding array index (for example, the aforementioned 8) in the third mapping table Table_3 as valid. However, since the memory controller 110 finds that the $6^{th}$ record Table_2[5] of the second mapping table Table_2 already stores the same memory block number, the memory controller 110 can directly determine that the data stored in the physical page corresponding to this record that was previously recorded in the second mapping table Table_2 is now invalid. Since this physical page is already an invalid page, as shown in FIG. 2F, the memory controller 110 may further amend the content, which was previously set to 'valid', recorded in the array index 1 in the third mapping table Table_3 to become 'invalid'. In other words, in the embodiments of the invention, the memory controller 110 may set the content of the corresponding array index in the third mapping table as invalid according to the content recorded in the second mapping table Table_2 (for example, the page number or the array index 1 recorded in the Table_2[5]).

According to an embodiment of the invention, the content of the third mapping table Table_3 may comprise the information of bit '0' and bit '1', so as to represent whether the corresponding page is a valid page or an invalid page. For example, the memory controller 110 may write the bit '1' as a record of a corresponding array index of the third mapping table Table_3 when setting the corresponding content of the record of the corresponding array index in the third mapping table as 'valid', and write the bit '0' as a record of a corresponding array index of the third mapping Table_3 when setting the corresponding content of the record o of the corresponding array index in the third mapping table as 'invalid'. It should be noted that the invention should not be limited to only use the bit '1' and bit '0' to represent whether the corresponding page is valid or not. For example, the memory controller 110 may also use the digits with other two different values to represent whether the corresponding page is valid or not.

Before the memory controller 110 has to read other records (for example, the $101^{th}$ to $200^{th}$ records) of the second mapping table Table_2 and/or the third mapping table Table_3, or after the memory controller 110 has updated/edited the second mapping table Table_2 and the third mapping table Table_3 according to the last record stored in the first mapping table Table_1, the memory controller 110 is configured to update/write the content of the second mapping table Table_2 and the third mapping table Table_3 back to the system region in the memory device 120. Note that the operations illustrated above can be applied to any memory block being selected as the buffer for receiving data. When the selected memory block is full, the memory controller 110 can update the content of the second mapping table Table_2 and edit the content of the third mapping table Table_3 according to the data written in the selected memory block.

According to an embodiment of the invention, after the content of the second mapping table Table_2 and the third mapping table Table_3 has been updated/written back to the memory device 120, the data stored in the first mapping table Table_1 may be discarded. That is, in an embodiment of the invention, the data storage device 100 may not reserve the F2H mapping table corresponding to the memory block.

The second mapping table Table_2 and the third mapping table Table_3 stored in the system region of the memory device 120 may be provided to and used by the memory controller 110 when performing some specific procedure. For example, according to an embodiment of the invention, when the memory controller 110 has to perform a garbage collection procedure to move data stored in one or more valid pages of one or more memory blocks to a target memory block, the memory controller 110 can directly use the content of the third mapping table Table_3 corresponding to each memory block to determine which physical page is still valid. In this manner, the memory controller 110 can directly pick up the valid pages and move the data stored in the valid pages to the target memory block.

Figure 3:
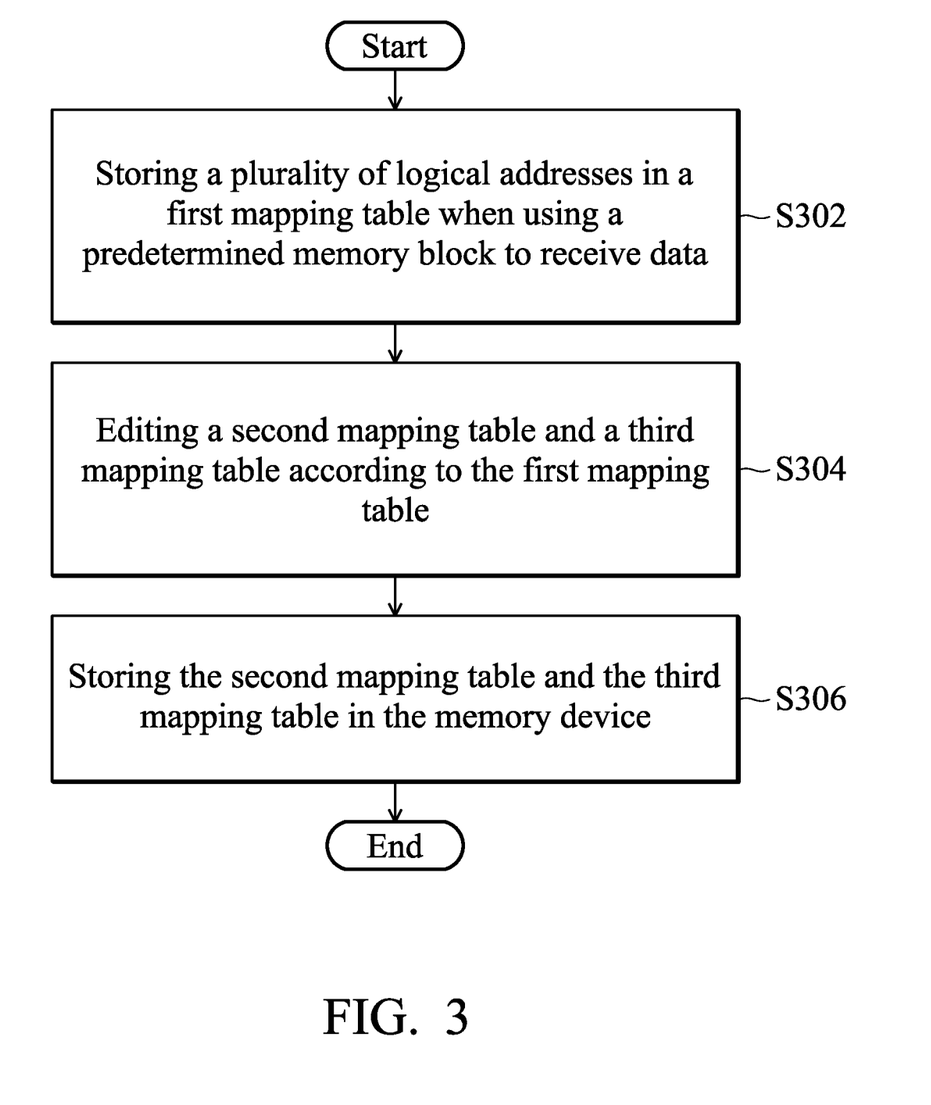
FIG. 3 is an exemplary flow chart of a data processing method for a data storage device according to an embodiment of the invention.

FIG. 3 is an exemplary flow chart of a data processing method for a data storage device according to an embodiment of the invention. First of all, the memory controller is configured to accordingly storing a plurality of logical addresses in a first mapping table when using a predetermined memory block to receive data (Step S302), so as to record which logical page the data stored in each physical page of the predetermined memory block is directed to. Next, when the predetermined memory block is full, the memory controller is configured to edit a second mapping table and a third mapping table according to the first mapping table (Step S304), where the second mapping table corresponds to a plurality of logical pages and is configured to record which memory block and which physical page is data of each logical page stored in, and the third mapping table corresponds to the physical pages of the predetermined memory block and is configured to indicate whether each physical page is a valid page or an invalid page. Finally, the memory controller is configured to store the second mapping table and the third mapping table in the memory device (Step S306).

As discussed above, since the one or a plurality of third mapping table Table_3 stored in the memory device 120 directly records whether the physical page of a corresponding memory block is a valid page or an invalid page, the memory controller 110 can quickly determine which physical pages are still valid pages according to the third mapping table Table_3. In this manner, the memory controller 110 can directly pick out the valid pages, and the access performance of the memory device can be greatly improved.

Use of ordinal terms such as "first", "second", "third", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A data storage device, comprising:
   a memory device, comprising a plurality of memory blocks, each memory block comprising a plurality of pages; and
   a memory controller, coupled to the memory device and configured to access the memory device,
   wherein the memory controller is configured to select a predetermined memory block to receive data and accordingly store a plurality of logical addresses in a first mapping table,
   wherein the memory controller comprises a buffer memory, the first mapping table is stored in the buffer memory to record which logical page the data stored in each physical page of the predetermined memory block is directed to,
   wherein when the predetermined memory block is full, the memory controller is configured to edit a second mapping table and a third mapping table according to the first mapping table and store the second mapping table and the third mapping table in the memory device, the second mapping table corresponds to a plurality of logical pages and records which memory block and which physical page is data of each logical page stored in, and the third mapping table corresponds to the physical pages of the predetermined memory block and indicates whether each physical page is a valid page or an invalid page,
   wherein the first mapping table records the logical addresses in a form of an array, an array index of the first mapping table corresponds to a physical page of the predetermined memory block, the second mapping table records a memory block number and a page number that correspond to each logical page in a form of an array, an array index of the second mapping table corresponds to a logical page, the third mapping table records whether each physical page of the predetermined memory block is a valid page or an invalid page in a form of an array, and an array index of the third mapping table corresponds to a physical page of the predetermined memory block,
   wherein when editing the second mapping table, the memory controller is configured to start from a starting array index of the first mapping table to sequentially check the logical addresses recorded in the first mapping table and check the second mapping table to find content recorded in corresponding positions of the second mapping table according to the logical addresses recorded in the first mapping table, and configured to update the content recorded in the second mapping table according to the memory block number of the predetermined memory block and a corresponding array index of the first mapping table,
   wherein when editing the third mapping table, after updating the content recorded in the second mapping table according to the memory block number of the predetermined memory block and the corresponding array index of the first mapping table, the memory controller is configured to set content of the corresponding array index in the third mapping table as valid,
   wherein the memory controller determines whether any physical page in the predetermined memory block is valid or invalid by directly looking up the third mapping table.

2. The data storage device as claimed in claim 1, wherein when editing the second mapping table and the third mapping table, when the memory controller finds that the memory block number of the predetermined memory block and a first array index have already been recorded in a specific position of the second mapping table when looking up the second mapping table, and the logical address recorded in a second array index of the first mapping table also is directed to the specific position of the second mapping table, the memory controller is configured to update content recorded in the specific position of the second mapping table according to the memory block number of the predetermined memory block and the second array index, set content of the second array index in the third mapping table as valid and set content of the first array index in the third mapping table as invalid.

3. The data storage device as claimed in claim 1, wherein the memory controller is further configured to perform a garbage collection procedure to move data stored in one or more valid pages of the predetermined memory block to a target memory block according to the third mapping table.

4. A data processing method for a data storage device, wherein the data storage device comprises a memory device and a memory controller, the memory device comprises a plurality of memory blocks, each memory block comprises a plurality of pages, the memory controller is coupled to the memory device and configured to access the memory device, and the method is performed by the memory controller and comprises:
   selecting a predetermined memory block to receive data and accordingly storing a plurality of logical addresses in a first mapping table, wherein the first mapping table is stored in a buffer memory of the memory controller and is configured to record which logical page the data stored in each physical page of the predetermined memory block is directed to;
   when the predetermined memory block is full, editing a second mapping table and a third mapping table according to the first mapping table, wherein the second mapping table corresponds to a plurality of logical pages and is configured to record which memory block and which physical page is data of each logical page stored in, and the third mapping table corresponds to the physical pages of the predetermined memory block and is configured to indicate whether each physical page is a valid page or an invalid page;

storing the second mapping table and the third mapping table in the memory device; and determining whether any physical page in the predetermined memory block is valid or invalid by directly looking up the third mapping table, wherein the first mapping table records the logical addresses in a form of an array, an array index of the first mapping table corresponds to a physical page of the predetermined memory block, the second mapping table records a memory block number and a page number that correspond to each logical page in a form of an array, an array index of the second mapping table corresponds to a logical page, the third mapping table records whether each physical page of the predetermined memory block is a valid page or an invalid page in a form of an array, and an array index of the third mapping table corresponds to a physical page of the predetermined memory block, wherein when the predetermined memory block is full, the step of editing a second mapping table and a third mapping table according to the first mapping table further comprises:

when editing the second mapping table, starting from a starting array index of the first mapping table to sequentially check the logical addresses recorded in the first mapping table and looking up the second mapping table according to the logical addresses recorded in the first mapping table;

updating content recorded in the second mapping table according to the memory block number of the predetermined memory block and a corresponding array index of the first mapping table; and when editing the third mapping table, setting content of the corresponding array index in the third mapping table as valid after updating the content recorded in the second mapping table according to the memory block number of the predetermined memory block and the corresponding array index of the first mapping table.

5. The data processing method as claimed in claim 4, wherein when the predetermined memory block is full, the step of editing a second mapping table and a third mapping table according to the first mapping table further comprises:

when the memory block number of the predetermined memory block and a first array index have already been recorded in a specific position of the second mapping table and the logical address recorded in a second array index of the first mapping table also directs to the specific position of the second mapping table, updating content recorded in the specific position of the second mapping table according to the memory block number of the predetermined memory block and the second array index, setting content of the second array index in the third mapping table as valid and setting content of the first array index in the third mapping table as invalid.

6. The data processing method as claimed in claim 4, further comprising:

performing a garbage collection procedure to move data stored in one or more valid pages of the predetermined memory block to a target memory block according to the third mapping table.

* * * * *